United States Patent [19]

Drumm

[11] Patent Number: 4,808,980
[45] Date of Patent: Feb. 28, 1989

[54] ELECTRONIC LIGHT POINTER FOR A PROJECTION MONITOR

[75] Inventor: Donald E. Drumm, Billerica, Mass.

[73] Assignee: Wang Laboratories, Inc., Lowell, Mass.

[21] Appl. No.: 112,199

[22] Filed: Oct. 22, 1987

[51] Int. Cl.[4] .............................................. G09G 3/02
[52] U.S. Cl. .................................... 340/707; 434/325; 434/335; 353/42
[58] Field of Search ............... 340/706, 707, 709, 720, 340/723, 744; 353/21, 28, 29, 30, 42, 43; 434/153, 324, 325, 337, 323, 335; 178/17 D, 17 R, 18, 87; 250/203 R, 203 CT, 205, 214 AG, 491.1, 561; 33/508; 358/93

[56] References Cited

U.S. PATENT DOCUMENTS

| | | | |
|---|---|---|---|
| 3,183,773 | 4/1963 | Weinstein | 353/43 |
| 3,665,615 | 5/1972 | Laplume | 434/325 |
| 3,885,096 | 5/1975 | Inuiya | 340/709 |
| 4,097,731 | 6/1978 | Krause et al. | 250/205 |
| 4,280,135 | 7/1981 | Schlossberg | 358/93 |
| 4,468,034 | 8/1984 | Duclos | 33/508 |
| 4,565,999 | 1/1986 | King et al. | 340/709 |
| 4,591,841 | 5/1986 | Gunderson et al. | 178/18 |
| 4,641,440 | 2/1987 | Agranov | 434/153 |
| 4,682,159 | 7/1987 | Davison | 340/709 |
| 4,698,625 | 10/1987 | McCaskill et al. | 340/706 |

Primary Examiner—Gerald L. Brigance
Assistant Examiner—Richard Hjerpe
Attorney, Agent, or Firm—Michael H. Shanahan; Kenneth L. Milik

[57] ABSTRACT

A cursor positioning device for a computer system having a projection display monitor including a screen. A light pointer in the form of an elongated housing is positioned with its tip at a selected location on the screen. A light sensor detects the raster scan trace and transmits a timed electrical signal to an interface, which determines the coordinates of the selected location for use by a computer in controlling the position of the cursor on the projection screen.

14 Claims, 4 Drawing Sheets

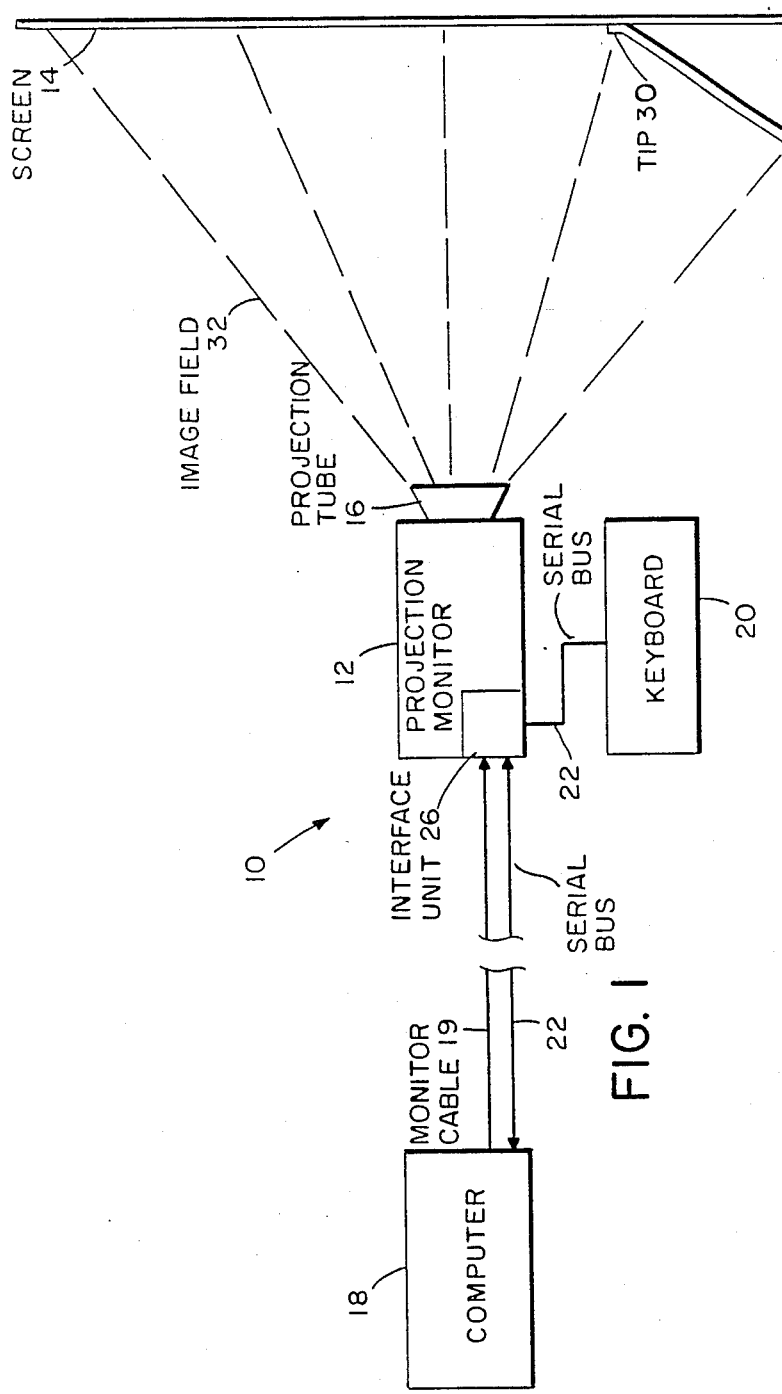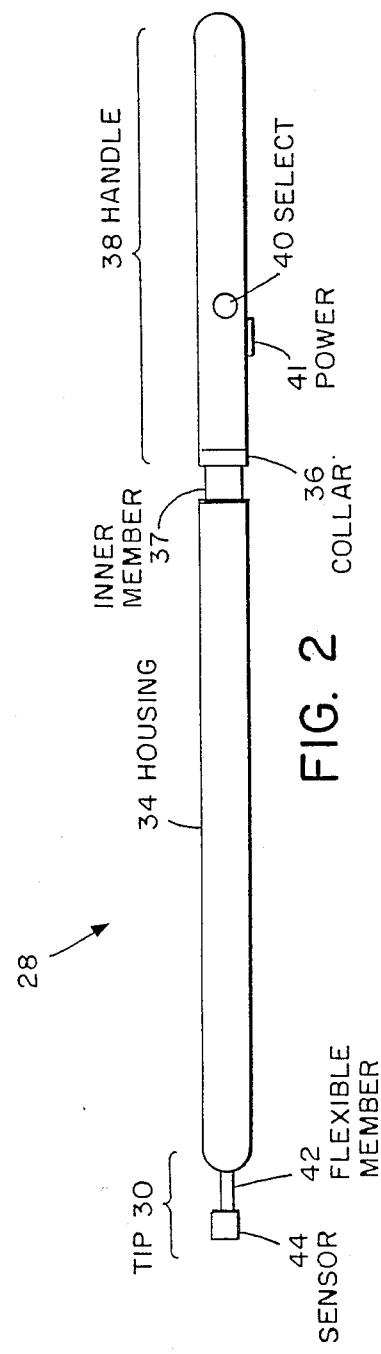

ELECTRONIC LIGHT POINTER FOR A PROJECTION MONITOR

FIELD OF INVENTION

This invention relates to cursor positioning devices for computer systems, and more particularly to a cursor positioning device in the form of an elongated pointer for use with a projection display monitor and screen.

BACKGROUND

Computer systems generally incorporate a display monitor unit having a cathode ray tube for providing a visual representation of selected data to a user. A specific point on the display is often indicated to the user by way of a brightly illuminated cursor. In various applications, the cursor may be moved by the user to any desired point on the display, for example, to edit text files or select menu options.

In the earlier prior art, the positioning control for the cursor was typically provided by keys which were are manually depressed by the user to incrementally move the cursor across the screen. To overcome the awkwardness of pressing keys multiple times to move the cursor across the screen, other input devices were devised, such as the light pen.

The light pen is positioned with its tip pointed toward the display face of a direct view CRT display. The tip of the light pen includes an optical sensor for detecting the raster scan trace as it excites the phosphors in the face of the cathode ray tube. The timing of the detected raster scan signal is translated into positional data, which, in turn, is used by the computer software to control the position of the cursor on the screen. As the user moves the tip of the light pen across the face of the cathode ray tube, the cursor moves along with it, giving the user the direct interactive "feel" of drawing on the CRT face.

One disadvantage of the light pen is its low resolution. Prior art light pens can sense an area of the display screen only as small as a character, instead of a pixel, or picture element, so that lines drawn on a screen often appear as blobs of light. This is caused primarily by the large size of the optical sensor element compared to the small size of the pixels on the display screen, the persistence of the excited phosphor on the screen, and parallax effects caused by the thick glass of the cathode ray tube face.

The disadvantages of the light pen are overcome somewhat by cursor positioning devices such as the "mouse", the joystick, and the graphics input tablet, which provide improved resolution and ease of use. However, these alternative cursor positioning devices do not provide the direct interactive "feel" provided by light pens. Instead, the user manipulates these devices on a table top, for example, and this effects a corresponding movement of the cursor on the display screen.

Where there is a need for a large number of users to view displayed data many computer systems have been adapted to use projection monochrome monitors instead of direct view CRT displays. With this type of monitor, a video image is projected on a screen having a diagonal measurement of three to five feet. Although first used only for the display of video programming, the projection display monitor is becoming a popular computer display device for group viewing situations, such as computer training classes, executive meetings, and conferences.

The use of a projection display monitor could be greatly enhanced by a cursor control device that would provide for moving the displayed cursor, selecting items on menus, drawing on the projection screen, and calling up files and display windows, the same way a user of a does with a conventional "mouse" device. It would also be desirable if the user could interact directly with the projected image on the screen, similar to the way a light pen is used with a direct view CRT display unit. In this way, the actions of the user would be readily visable to the viewing group. It would be further desirable if the motion of the cursor could be resolved to the pixel level, making possible the writing or drawing fine lines on the screen.

According, it is an object of the present invention to provide a cursor positioning device for a projection monitor and display screen;

It is another object of the present invention to provide a cursor positioning device which allows the user to interact directly with the projected image; and It is a further object of the present invention to provide a cursor positioning device having a high degree of resolution.

SUMMARY OF THE INVENTION

In accordance with the present invention, a novel light pointer is provided for a computer using a projection display monitor and screen, whereby direct interactive control of a cursor is obtained. The present invention provides a user with the capability of walking up to the screen, as in a classroom, positioning the tip of the light pointer on the displayed image, and moving the cursor, selecting menus, drawing figures, and performing other control functions, with a resolution close to one pixel.

In the present invention, a conventional monochrome projection monitor projects images of display data on a vertically oriented, wall mounted screen, by means of a raster scanned projection tube. This creates a projected image of generally three to five feet diagonal, allowing the displayed image to be viewed by a large number of users, as in a classroom or conference room. The projection monitor receives a video and timing signals from a computer.

In the preferred embodiment, the light pointer of the present invention is a wireless, battery-powered unit, and has a physical appearance not unlike that of a pointer used with a blackboard in classroom situations. The light pointer includes a elongated, cylindrical housing and is provided with a telescoping inner cylinder to permit a user to adjust the length of the housing for moving the tip to any point on the screen without creating shadows. The housing includes a handle portion including a select switch for performing computer control operations and a tip. The tip includes a flexible member and a light sensor for detecting the raster scan trace emitted from the projection tube at a user selected location on the screen. The light pointer contains circuitry for creating a timed electrical signal, in response to the detected raster scan trace, which is representative of the selected location of the tip on or near the screen surface.

The light pointer is linked to an interface by means of an FM transmitter/receiver arrangement. The interface circuitry includes a microcontroller which determines the location of the light sensor on the screen by means of the timed electrical signal received from the light pointer. The interface translates the timing of this detected signal into vertical scan line and pixel position data, and transmits this position in the form of X and Y coordinate data to the video display controller of the computer, by a serial bus. The computer, in turn, generates cursor signals adapted for controlling the position of the cursor on the screen of the projection display monitor.

In operation, the user holds the light pointer on or near the screen and aims the light sensor at the projection tube, not at the screen. When the tip of the light pointer is rested lightly against the screen at a selected location, the flexible member aligns the sensor perpendicularly to the face of the projection tube so that it will receive the maximum intensity of projected image field from the projection tube.

In the office environment, for example, where ten or fifteen people may be present in a small conference room, the light pointer gives the user the capability of calling up files and editing data on the screen, by means of the select switch provided, in a directly interactive manner, while providing commentary to the audience. The projected image on the screen becomes, in a very basic sense, a electronic blackboard.

Furthermore, in the projected image, since the raster has been expanded considerably, each pixel element is very close to the size of the light sensor, and very fine movement of the cursor may be effected. This feature is especially useful in writing on the projected image, or drawing representations of graphical data. High resolution of this type is generally not possible with direct view CRT displays using light pen input devices.

These and other objects and features of the present invention will be understood from the description to follow, taken in conjunction with the accompanying drawings.

DESCRIPTION OF THE DRAWINGS

FIG. 1 illustrates in block form the major components of the system embodying the present invention;

FIG. 2 is a plan view of the light pointer of the present invention:

DESCRIPTION OF THE PREFERRED EMBODIMENT

Figure 3:
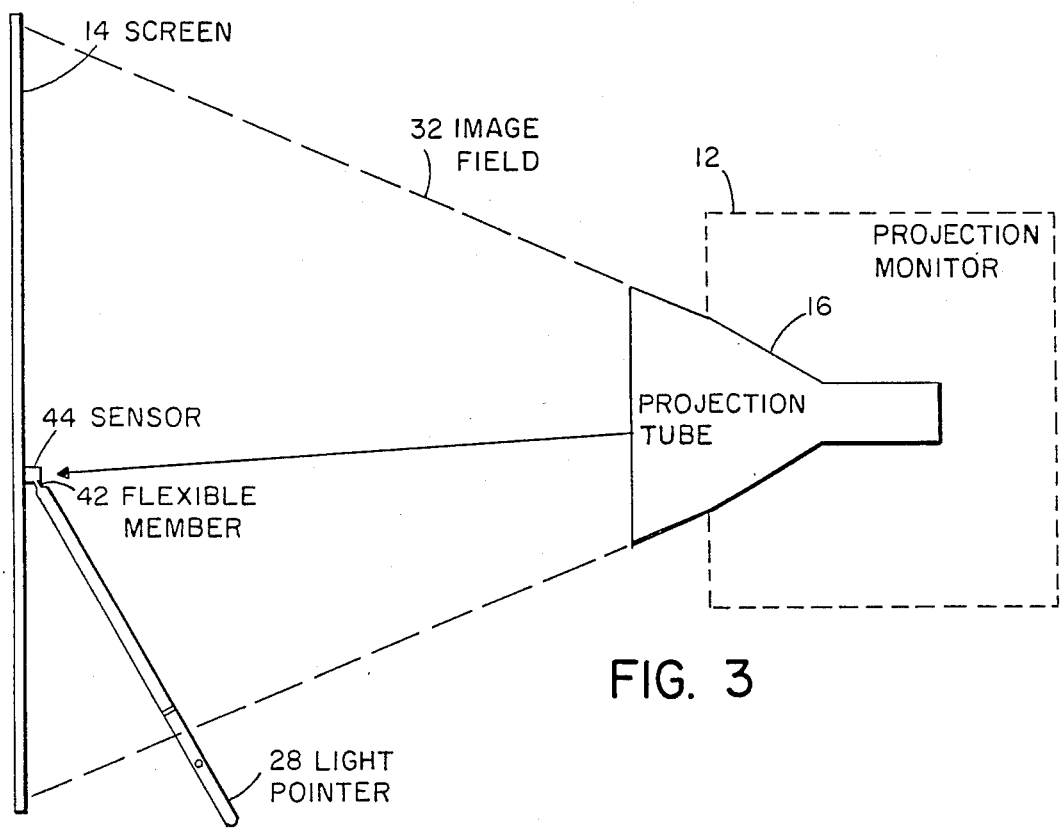
FIG. 3 schematically shows the proper orientation of the light pointer when in use.

Turning attention first to FIG. 1, a video projection system 10 is shown which uses the present invention. A projection monitor 12 projects images on a screen 14. The screen 14 is oriented vertically, and preferably mounted on a wall. The monitor 12 is a conventional monochrome projection type, employing a projection tube 16, and would preferably be used for projecting images of computer display screens, including alphanumeric characters, graphical data, and computer menus. As such, the projection monitor 12 and screen 14 employed herein are used identically to a direct view CRT display terminal unit employed in a conventional computer system. It is also important to note that the projection monitor 12 uses standard raster scanning, in which the timing of the displayed image data is determined by horizontal and vertical sync pulses.

With a projection monitor 12 of the described type, the image size projected on the screen 14 generally has a diagonal dimension of three to five feet. This is for the purpose of making the displayed image visable to a large number of viewers, as when the video projection system 10 is used in a classroom environment, a lecture hall, or an executive conference room. However, the principles of the present invention are applicable to rear projection video monitors, which incorporate a projection tube and translucent screen in a single unit and project the image from behind the screen. And further, although the preferred embodiment employs a monochrome projection monitor 12, color monitors of various types may also be used.

The projection monitor 12 receives video and timing signals from a computer 18 by means of a monitor cable 19. The computer 18 is also coupled to a keyboard 20 by means of a serial bus 22. The serial bus 22 carries keyboard control and data signals to and from the computer 18. The serial bus 22 also carries data to the computer 18 from an interface unit 26, which operates with the present invention and will described in more detail further on. By using the configuration described, the projection monitor 12 and keyboard 20 can conveniently be placed on a table top, and the computer 18 can be located some distance away, coupled to the keyboard 20 by the serial bus 22 cable and the monitor cable 19.

A light pointer 28, according to the present invention, is shown in FIG. 1, oriented with its tip 30 near the screen 14, within the raster scanned image field 32 emitted from the projection tube 16. The purpose of the light pointer 28 is to detect the individual raster scan trace emitted from the projection tube 16 at a selected location on or near the screen 14 and to provide a timed electrical signal to the interface 26, which is related to the location of the tip 30 on or near the screen.

The light pointer 28 is linked to the interface 26 by means of an FM transmitter/receiver arrangement, which will be described. Used with the other elements of the present invention, the light pointer 28 is a versatile cursor control device for the screen 14. The light pointer 28 performs functions equaling those of "mouse" input devices, graphics input tablets, or light pens used with conventional direct view display units. The user is provided with the capability of moving a displayed cursor, selecting menus, drawing figures, and other interactive functions, with a resolution close to one pixel.

Turning now to FIG. 2, the light pointer 28 is shown in more detail. The light pointer 28 includes a elongated, cylindrical housing 34, preferably fabricated from a durable, metallic material, to shield the components of the light pointer 28 from magnetic fields associated with the projection monitor 12.

The housing 34 separates at collar 36 and includes an inner cylindrical member 37 to provide a telescoping action which permits a user to adjust the length of the housing 34, as desired. In the preferred embodiment, the length of the housing 34 may be varied from 12 to 20 inches. Ideally, the housing 34 should be long enough to allow the user to select a position on the screen 14 without putting his hands or arms into the image field 32. This minimizes shadows on the screen 14.

The housing 34 includes a handle portion 38 for gripping the light pointer 28. A SELECT switch 40, included in the handle portion 38, may be conveniently activated by the user's thumb pressure. It is within the scope of the present invention for additional switches to be included in the handle portion 38 with functions such as RETURN and EXECUTE. These are conventional functions for the manipulation of displayed data or graphics in a computer system having a "mouse" input device. Switch 41 provides power to the light pointer 28.

The tip 30 includes a flexible member 42 and a light sensor 44. The light sensor 44 is for detecting the raster scan trace emitted from the projection tube 16. In operation, the user holds the light sensor 44 near the screen 14 at a selected location and aims the light sensor 44 at the projection tube 16, not at the screen 14; therefore, the raster scanned image field 32 is detected as it approaches the screen 14, rather than as it is reflected off the screen 14. The light sensor 44, therefore, detects a focused, high intensity light source. Operating off the reflected image, the light pointer would not be as sensitive.

In FIG. 3, the light pointer 28 is shown in the correct operating relationship with the screen 14. The light pointer 28 is held lightly against the screen 14 or slightly away from it. The flexible member 42 functions to align the light sensor 44 generally perpendicular to the face of the projection tube 16 so that it will receive the maximum intensity of the projected image field 32 from the projection tube 16.

Figure 4:
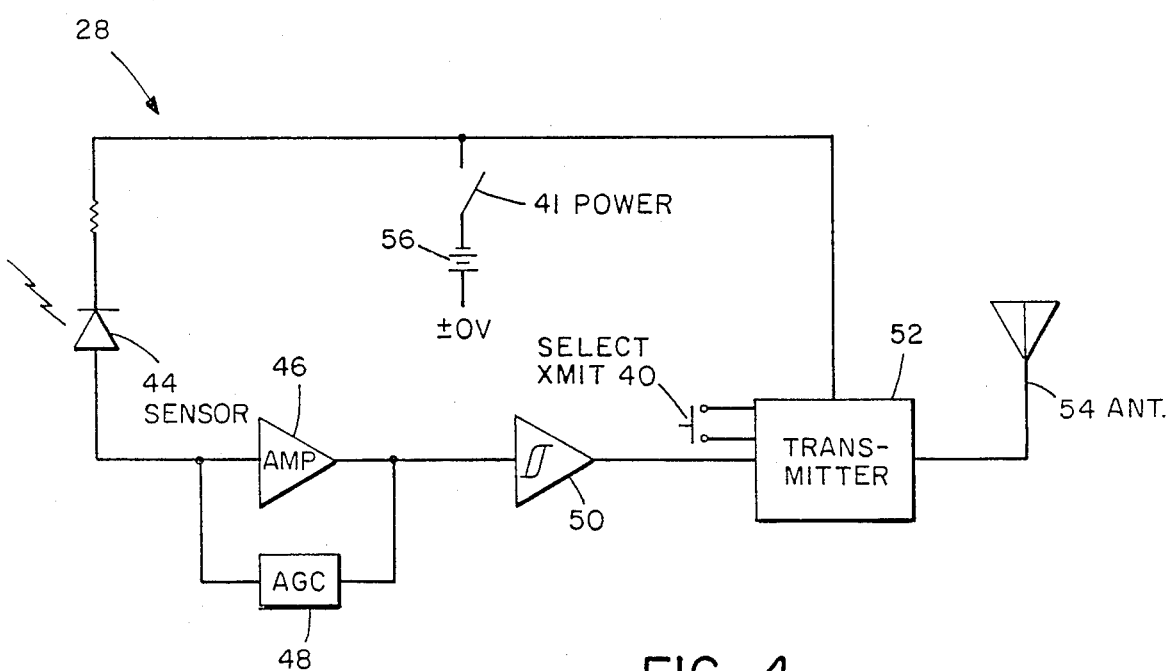
FIG. 4 presents a block schematic diagram of the light pointer of the present invention.

Turning now to FIG. 4, a block schematic diagram of the light pointer 28 is shown. The circuitry of light pointer 28 is primarily for detecting the individual raster scan trace at the location of the light sensor 44 relative to the screen 14, and for generating a timed electrical signal representative of that location. The timed electrical signal is transmitted to the interface 26, which determines the position of the light sensor 44 in relation to the vertical scan line and pixel position in that display frame.

In the preferred embodiment, the light sensor 44 is a photodiode. The light sensor detects the raster scan trace and presents a pulse to the input of an AC coupled, high-frequency amplifier 46. The amplifier 46 has a very high gain level, in order to ensure that it detects the low background level raster scan pulse.

The amplifier 46 is provided with an automatic gain control 48. The automatic gain control 48 is needed to compensate for variations in the brightness of the image field 32. It is desirable for the amplifier 46 to function at same output amplitude level, with bright or dark pictures or in bright or dark areas of the screen, without becoming saturated and to ensure uniform operation.

The automatic gain control 48 monitors the output of the amplifier 46 by sensing two threshold voltage levels. When the automatic gain control 48 senses a high level output voltage, it decreases the gain of the amplifier 46; when it senses a low level output voltage, it increases the gain of the amplifier 46.

A Schmitt trigger 50 is used to square up the edges of the amplified analog pulse received from amplifier 48. The output of the Schmitt trigger is a logical low until the input signal reaches a threshold level, at which time the output goes high and remains high.

The light pointer 28 is wireless, and an FM transmitter 52 and antenna 54 is used to transmit the amplified, squared raster scan pulse, in the form of a timed electrical signal to the interface 26. The FM transmitter 52 was selected because the time delay introduced in FM transmission is of a fixed value, and this delay is easily compensated for by the software in the computer 18. Power for the light pointer 28 is provided by battery supply 56. The power switch 41 controls the battery supply. A select switch 40 for selecting and manipulating data is coupled to the transmitter 52.

Figure 5:
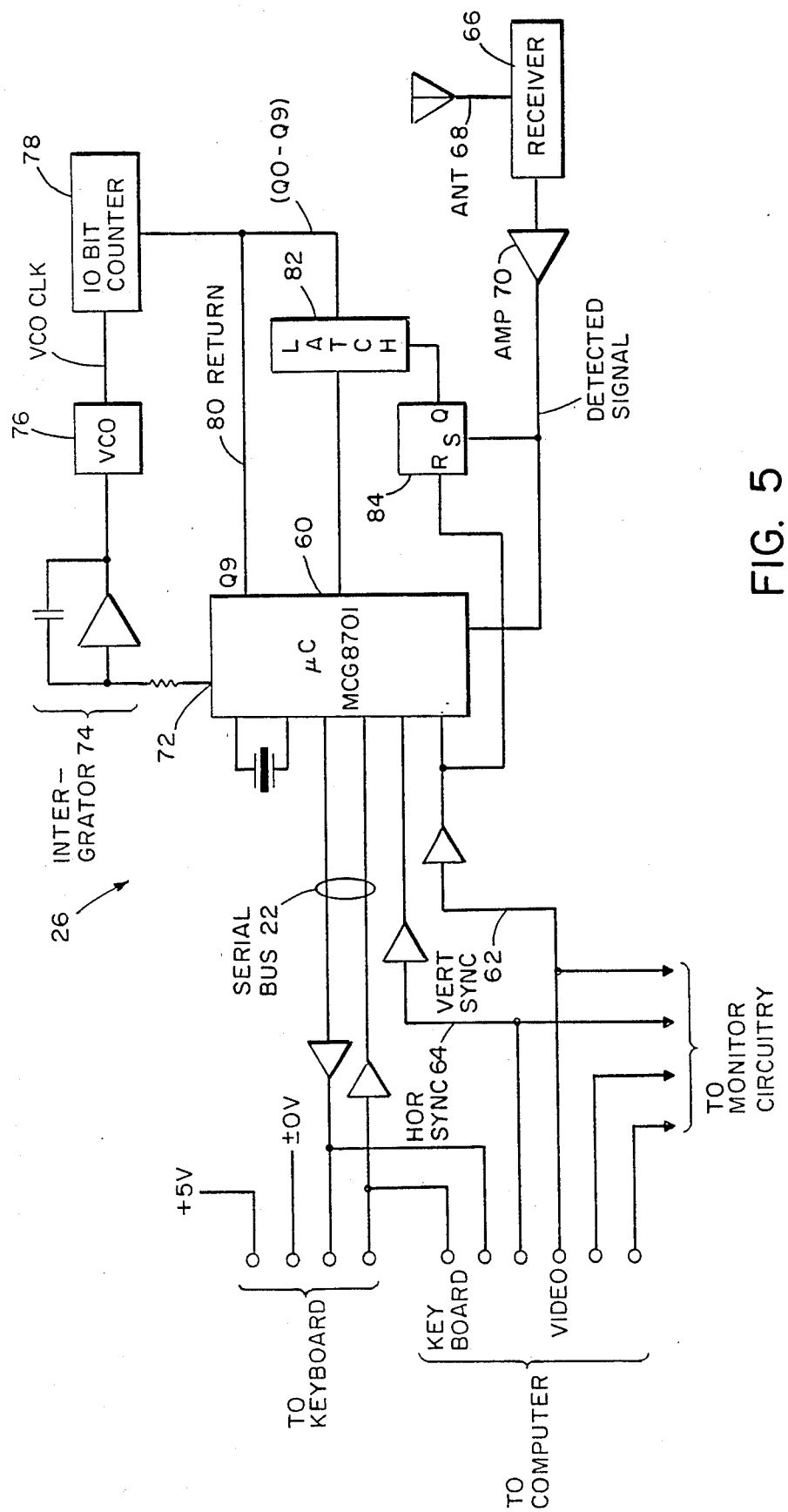
FIG. 5, a presents a block schematic of the interface used with the present invention.

Turning now to FIG. 5, a block schematic diagram of the interface 26 is shown. The interface 26 is contained on a circuit card in the projection monitor and includes the circuitry for determining the position of the light sensor 44 on the screen 14.

A microcontroller 60 (Motorola type MC68701) and associated circuitry control the interface between the light pointer 28 and the serial bus 22. The microcontroller 60 detects the timed electrical signal transmitted from the light pointer 28, translates the timing of this detected signal into vertical scan line and pixel position data, and finally transmits this position in the form of X and Y coordinate data to the video display controller of the computer 18, by the serial bus 22. This occurs 60 times per second.

Figure 6:
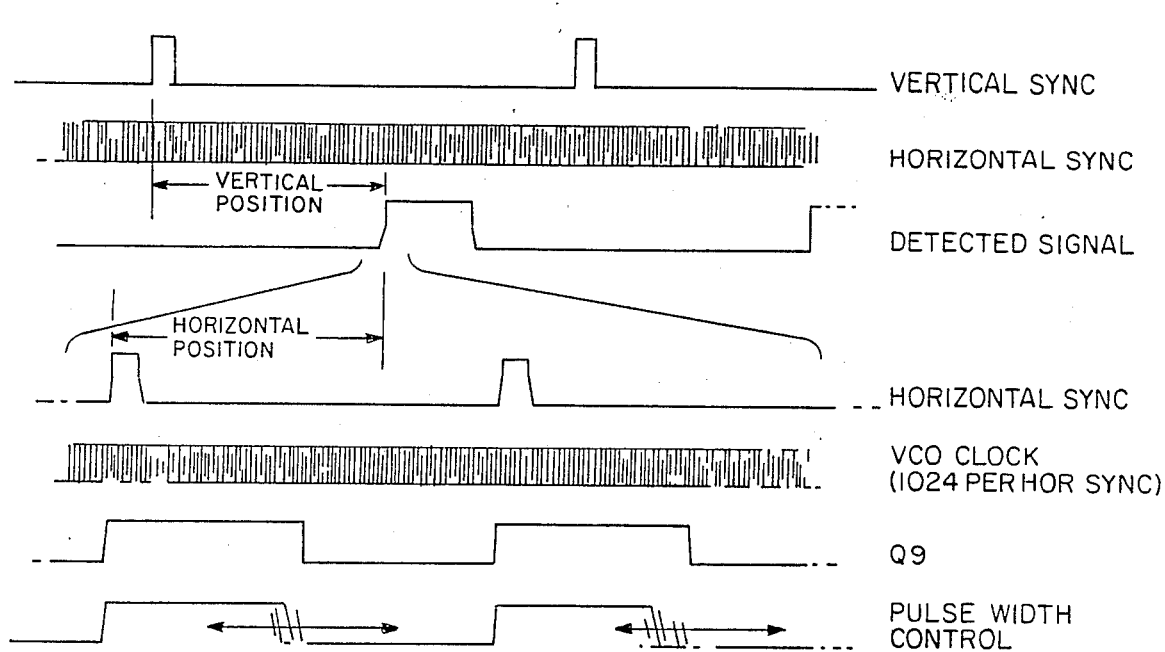
FIG. 6 illustrates the timing diagrams associated with the interface used with the present invention.

The microcontroller 60 receives vertical sync 62 and horizontal sync 64 inputs from the video display controller in the computer 18, which are also presented to the display circuitry of the projection monitor 12. As is well known to those skilled in the art, each vertical sync pulse starts a new frame of displayed data in projection monitor 12, and each horizontal sync pulse starts a new scan line. This relationship can be appreciated by considering the first two timing signals illustrated in FIG. 6.

The detected signal is received by an FM receiver 66 and antenna 68 and amplified through an amplifier 70. The leading edge of the detected signal indicates the location of the light sensor 44, as shown in the third timing signal of FIG. 6. The microcontroller 60 receives the detected signal and determines the frame and vertical scan line where the light sensor 44 is located by means of the vertical sync and horizontal sync pulses. However, pixel position is more difficult to determine, firstly, because there are no pixel timing signals coming from the video generator board in the computer 18, and secondly, because the frequency of the pixels is faster than the microcontroller 60 can count.

The microcontroller 60 determines pixel position in the scan line by means of a phase lock loop arrangement which functions as a pixel counter, dividing each scan line into 1024 positions. The phase locked loop includes the pulse width control output 72 of the microcontroller 60, an integrator 74, a voltage controlled oscillator 76, a ten bit counter 78, and a return loop 80.

The voltage controlled oscillator 76 operates continuously at approximately 20 MHz. The output, or VCO clock, is presented to the ten bit counter 78. The output pins (Q0–Q9) of the counter 78 are connected to a latch 82, which will be described. The highest order bit (Q9) is also presented to the microcontroller 60 through the return loop 80. At a count of 1024, the Q9 output of the counter 78 goes high.

The microcontroller 60 compares the horizontal sync pulse with the Q9 output and matches the timing of the two signals by varying the duty cycle of output 72. The output 72 signal is presented to integrator 74, which outputs a variable DC signal that controls the frequency of the voltage controlled oscillator 76.

This phase lock loop arrangement ensures that the leading edge of each horizontal sync pulse will be synchronized with the leading edge of the Q9 output of counter 78. Therefore, every time a horizontal sync pulse occurs, starting a new scan line, the counter 78 accurately increments through 1024 pixel positions for that scan line. This provides a very high resolution of pixel position. This relationship is illustrated in the four bottom timing diagrams in FIG. 6.

At the same time the detected raster signal is received by the microcontroller 60, an RS flip-flop 84 sets the latch 82, which receives the outputs (Q0–Q9) of the counter 78. The latch 82 holds the binary count of counter 78 at the instant the detected signal is received. The microcontroller 60 then reads the binary count from the latch 82, which indicates the pixel position of light sensor 44 in the scan line. The RS flip-flop and latch 82 are reset at the start of the next frame by the vertical sync pulse.

The vertical scan line and pixel position, in the form of X and Y coordinate data, are transmitted to the video display controller of the computer 18 over the bus 22. The computer 18 provides means for generating cursor control signals adapted for controlling the position of the cursor in response to the position signals received from the interface 26.

In operation, the user holds the tip of the light pointer on or near a selection and aims the light sensor at the projection tube. When the tip of the light pointer is rested lightly against the screen at a selected location, the flexible member aligns the sensor perpendicularly to the face of the projection tube so that it will receive the maximum amount of intensity of the image field from the projection tube.

In a classroom or executive office environment where a number of persons may be viewing the projected computer display, the user has the capability of calling up files and editing data on the screen, by means of the select switch provided, in a directly interactive manner, while providing commentary to the audience, or by direction from viewers in the audience. The projected image becomes, in a very basic sense, the computer display equivalent of an electronic blackboard.

Furthermore, in the projected image, since the raster has been expanded considerably, each pixel element is very close to the size of the light sensor, and very fine movement of the cursor may be effected.

High resolution is generally not possible with direct view CRT displays using light pen input devices. In a conventional direct view video display monitor with a standard 12 inch diagonal screen having a resolution of 800×300 pixels, the width of the screen is approximately eight inches, and the diameter of each pixel is therefore 0.01 inches. When the screen size is expanded, as in the present invention, to an image area having a five foot diagonal dimension, the width of the projected image is approximately four feet. With a resolution of 800 dots per inch, each pixel now has a diameter of approximately 0.125 inches, which is also the approximate size of the light sensor. The high pixel resolution of the present invention makes it possible for a user to create fine lines on the projected image, as in writing or drawing.

The closer the light pointer is held to the screen, the greater the accuracy, because the image field has been expanded to its maximum area. However, the light pointer does not require actual contact with screen to function properly. Still, it is desirable to keep the light pointer close enough to the screen to minimize shadows on the screen from the light pointer housing. Shadow effects caused by the operators hands or arms are eliminated by adjusting the length of the pointer housing so that all positions of the screen may be selected without the hands of the user intruding in the image field.

In view of the above, it will be seen that the several objects of the present invention are readily achieved and other advantageous results attained.

Obviously many modifications and variations of the present invention are possible in light of the above teachings, without departing from the spirit and scope of the invention. The novel light pointer disclosed herein is applicable to a wide range of uses. In view of this, it is understood that the above description is illustrative rather than limiting.

What is claimed is:

1. A cursor positioning system for a computer system having a projection display monitor including a screen, comprising
    light sensor means for detecting a raster scan trace at a selected location near the surface of the screen of the projection display monitor;
    means responsive to said sensor means for generating position signals representative of the selected location on the screen of the projection display monitor;
    means for generating cursor signals adapted for controlling the position of a cursor on the screen of the projection display monitor in response to said position signals; whereby said light sensor means designates a high resolution cursor on said screen of the projection display monitor, said high resolution cursor having a resolution close to one pixel.

2. A system according to claim 1, wherein said light sensor means is a photodiode included in the tip of an hand-held elongated housing.

3. A system according to claim 2, wherein said hand-held elongated housing is 12 to 20 inches in length.

4. A computer display system comprising
    a computer;
    a projection video display monitor for projecting raster scanned image data, coupled to said computer;
    a screen for displaying said image data;
    a light pointer, the pointer including means for detecting a raster scan trace at a selected location near the surface of the screen of the projection display monitor and means for generating a timed electrical signal in response to the raster scan trace;
    interface means, coupled to the light pointer and the computer, for translating the timed electrical signal into position signals representative of the selected location on the screen;
    the computer generating cursor signals adapted for controlling the position of a cursor on the screen of the projection display monitor in response to said position signals; whereby said light pointer designates a high resolution cursor on said screen, said high resolution cursor having a resolution close to one pixel.

5. A computer display system according to claim 4, wherein the light pointer includes a hand-held elongated housing with a telescoping inner member for varying the length of said housing.

6. A computer display system according to claim 4, wherein the light pointer and interface means are coupled by means of an FM transmitter in the light pointer and an FM receiver in the interface means.

7. A computer display system according to claim 4, wherein the light pointer includes a select switch for selecting items displayed on the screen.

8. A pointer device for controlling the position of a cursor in a computer system having a projection display monitor including a screen, comprising an elongated housing, having a handle portion and a tip;

said tip including a light sensor for detecting a raster scan trace at a selected location near the surface of the screen of the projection display monitor;

signal generating means, coupled to said light sensor, for generating a timed electrical signal in response to the detected raster scan trace; and interface means, coupled to the light pointer and the computer, for translating the timed electrical signal into position signals representative of the selected location on the screen;

whereby the computer generates cursor signals adapted for controlling the position of a cursor on the screen of the projection display monitor in response to said position signals; and whereby said tip of said pointer device designates a high resolution cursor on said screen of the projection display monitor, said high resolution cursor having a resolution close to one pixel.

9. A pointer device according to claim 8, wherein said elongated housing includes a telescoping inner member for varying the length of said housing.

10. A pointer device according to claim 8, wherein the light pointer and interface means are coupled by means of an FM transmitter in the light pointer and an FM receiver in the interface means.

11. A pointer device according to claim 8, wherein the light pointer includes a select switch for selecting items displayed on the screen.

12. A pointer device according to claim 8, wherein the tip includes a flexible member for orienting the light sensor toward the projection monitor when the tip contacts the screen.

13. A pointer device according to claim 8, wherein said signal generating means includes an automatic gain control to compensate for variations in the brightness of the image field.

14. A pointer device according to claim 8, wherein said elongated housing is 12 to 20 inches in length.

* * * * *